United States Patent
Lim et al.

(10) Patent No.: US 10,982,668 B2
(45) Date of Patent: Apr. 20, 2021

(54) LINEAR COMPRESSOR AND METHOD FOR CONTROLLING LINEAR COMPRESSOR

(71) Applicant: LG Electronics Inc., Seoul (KR)

(72) Inventors: Sungjin Lim, Seoul (KR); Gyunam Kim, Seoul (KR); Nayi Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 15/857,369

(22) Filed: Dec. 28, 2017

(65) Prior Publication Data

US 2018/0195509 A1 Jul. 12, 2018

(30) Foreign Application Priority Data

Dec. 30, 2016 (KR) .................. 10-2016-0184417

(51) Int. Cl.
*F04B 49/06* (2006.01)
*F04B 49/22* (2006.01)
(Continued)

(52) U.S. Cl.
CPC ............ *F04B 49/065* (2013.01); *F04B 35/04* (2013.01); *F04B 49/06* (2013.01); *F04B 49/22* (2013.01); *G05B 17/02* (2013.01); *F04B 2201/0201* (2013.01); *F04B 2203/0401* (2013.01); *F04B 2203/0402* (2013.01)

(58) Field of Classification Search
CPC ........ F04B 49/065; F04B 35/04; F04B 49/22; F04B 2203/0401; F04B 2201/0201; F04B 2203/0402; G05B 17/02
See application file for complete search history.

(56) References Cited

U.S. PATENT DOCUMENTS 5,342,176 A * 8/1994 Redlich ................. F04B 35/045
318/687
2007/0196214 A1 8/2007 Bocchiola
(Continued)

FOREIGN PATENT DOCUMENTS

EP 1469580 A1 10/2004
KR 742041 A1 7/2007
(Continued)

OTHER PUBLICATIONS

European Extended Search Report in European Application No. 17210854.0, dated May 15, 2018, 11 pages.

*Primary Examiner* — Eduardo Colon Santana
*Assistant Examiner* — Bradley R Brown
(74) *Attorney, Agent, or Firm* — Fish & Richardson P.C.

(57) ABSTRACT

Provided is a linear compressor capable of reducing noise and manufacturing cost. The linear compressor includes a piston reciprocating within a cylinder, a motor providing a driving force for movement of the piston, a sensing unit sensing a motor voltage and a motor current related to the motor, a discharge part installed at one end of the cylinder and adjusting discharge of a refrigerant compressed within the cylinder, and a controller detecting a load variation of the motor using at least one of the motor voltage and the motor current, calculating a compensation value related to a position of the piston each time a load variation of the motor is detected, and detecting an absolute position of the piston using the calculated compensation value.

17 Claims, 8 Drawing Sheets

(51) Int. Cl.
*F04B 35/04* (2006.01)
*G05B 17/02* (2006.01)

(56) References Cited

U.S. PATENT DOCUMENTS

2013/0038257 A1\* 2/2013 Sato .................. H02P 6/12
                                              318/400.22
2015/0176579 A1\* 6/2015 Lim .................. F04B 49/065
                                              62/230

FOREIGN PATENT DOCUMENTS

| WO | WO2000079671 A1 | 12/2000 |
| WO | WO2007123323 A1 | 11/2007 |

\* cited by examiner

LINEAR COMPRESSOR AND METHOD FOR CONTROLLING LINEAR COMPRESSOR

CROSS-REFERENCE TO RELATED APPLICATION

Pursuant to 35 U.S.C. § 119(a), this application claims the benefit of earlier filing date and right of priority to Korean Application No. 10-2016-0184417, filed on Dec. 30, 2016, the contents of which is incorporated by reference herein in its entirety.

BACKGROUND OF THE INVENTION

1. Field of the Invention

The present disclosure relates to a linear compressor and a method for controlling the same, and particularly, to a linear compressor controlling movement of a piston without using a separate sensor, and a method for controlling the same.

2. Background of the Invention

Generally, a compressor, a device for converting mechanical energy into compressive energy of a compressible fluid, is used as part of a refrigerating machine, for example, a refrigerator or an air conditioner.

Compressors are classified as a reciprocating compressor, a rotary compressor, and a scroll compressor. In the reciprocating compressor, a compression space in which a working gas is sucked or discharged is formed between a piston and a cylinder, and the piston linearly reciprocates within the cylinder to compress a refrigerant. In the rotary compressor, a compression space in which a working gas is sucked or discharged is formed between an eccentrically rotating roller and a cylinder so that a refrigerant is compressed as the cylinder eccentrically rotates along an inner wall of the cylinder. In the scroll type compressor, a compression space in which a working gas is sucked or discharged is formed between an orbiting scroll and a fixed scroll so that a refrigerant is compressed as the orbiting scroll rotates along the fixed scroll The reciprocating compressor sucks, compresses, and discharges a refrigerant gas by linearly reciprocating the internal piston within the cylinder. The reciprocating compressor is classified as a recipro-type and a linear type depending on a way in which the piston is driven.

The recipro scheme is that a crankshaft is coupled to a rotary motor and a piston is coupled to the crankshaft to convert a rotational motion of the motor into a linear reciprocating motion. Meanwhile, the linear scheme is that a piston is connected to a mover of a motor that linearly moves to reciprocate the piston by a rectilinear motion of the motor.

Such a reciprocating compressor includes a driving unit generating a driving force and a compression unit compressing a fluid upon receiving the driving force from the electric unit. A motor is generally used as the electric unit, and in the case of the linear scheme, a linear motor is used.

Since the linear motor directly generates a linear driving force by itself, it does not require a mechanical conversion device a structure thereof is not complicated. In addition, the linear motor has features that can reduce loss due to energy conversion and greatly reduce noise because there is no joint where friction and abrasion occur. Further, when a linear type reciprocating compressor (hereinafter referred to as a linear compressor) is used in a refrigerator or an air conditioner, a compression ratio may be changed by changing a stroke voltage applied to the linear compressor, and thus, the linear compressor may also be used to variably control freezing capacity.

Meanwhile, since the linear compressor reciprocates in a state in which a piston is not mechanically restrained within a cylinder, if an excessive voltage is applied suddenly, the piston may collide with a cylinder wall or the piston may not move forward due to a large load, resulting in failure of compression. Thus, a control device for controlling the motion of the piston with respect to the load variation or the voltage variation is essential.

Generally, a compressor control device performs feedback control by detecting a voltage and a current applied to a compressor motor and estimating a stroke in a sensorless manner. Here, the compressor control device includes a triac or an inverter as means for controlling a compressor.

In particular, in the linear compressor, since the piston is not mechanically restrained within the cylinder, a position of the piston at the initial stage of driving and a position of the piston in the middle of driving may be different.

In general, since a force applied to the piston when the piston of the linear compressor moves toward a top dead center is greater than a force applied to the piston when the piston moves toward a bottom dead center, the piston is gradually pushed from a discharge port after the compressor starts driving.

According to a control algorithm of a general linear compressor, it is not possible to detect an absolute position of the piston without a sensor, and thus, it is difficult for the controller of the linear compressor to accurately detect stroke of the piston changed in position as the compressor is driven.

SUMMARY OF THE INVENTION

Therefore, an aspect of the detailed description is to provide a linear compressor capable of detecting an absolute position of a piston without a separate sensor, and a method for controlling the same.

Another aspect of the detailed description is to provide a linear compressor which performs a highly efficient operation, while reducing noise of the linear compressor, and a method for controlling the same.

Another aspect of the detailed description is to provide a linear compressor in which occurrence of noise is reduced and manufacturing cost is reduced.

To achieve these and other advantages and in accordance with the purpose of this specification, as embodied and broadly described herein, a linear compressor includes: a piston reciprocating within a cylinder; a motor providing a driving force for movement of the piston; a sensing unit sensing a motor voltage and a motor current related to the motor; a discharge part installed at one end of the cylinder and adjusting discharge of a refrigerant compressed within the cylinder; and a controller detecting a load variation of the motor using at least one of the motor voltage and the motor current, calculating a compensation value related to a position of the piston each time a load variation of the motor is detected, and detecting an absolute position of the piston using the calculated compensation value.

The controller may estimate a stroke of the piston using the motor voltage and the motor current, and calculate a distance over which the piston was pushed from an initial position of the piston before driving of the linear compressor starts, on the basis of the estimated stroke.

The controller may calculate a distance between a top dead center (TDC) of the piston and the discharge part using the estimated stroke and the calculated pushed distance.

The controller may calculate a parameter related to movement of the piston in real time using the estimated stroke and the detected motor current, calculate a distance between the TDC of the piston and the discharge part at the time point when the calculated parameter forms a point of inflection, and calculate the compensation value by comparing the calculated distance with a preset reference distance.

The controller may re-calculate the distance between the TDC of the piston and the discharge part on the basis of the calculated compensation value.

The controller may control the motor such that the distance between the TDC of the piston and the discharge part is maintained at a distance equal to or shorter than a preset limit distance.

The controller may detect an operation rate of the motor, and determine whether a load variation of the motor has occurred on the basis of the detected operation rate.

When the motor is initially driven, the controller may calculate the compensation value related to the position of the piston.

When a load variation of the motor is equal to or smaller than a predetermined value during a preset time interval, the controller may calculate the compensation value related to the position of the piston.

The controller may detect a phase difference between the estimated stroke and the motor current, and calculate the distance over which the piston was pushed using the detected phase difference.

The controller may calculate a first parameter and a second parameter using the phase difference and calculate the pushed distance of the piston using the first parameter, the second parameter, and the stroke.

To achieve these and other advantages and in accordance with the purpose of this specification, as embodied and broadly described herein, a linear compressor includes: a piston reciprocating within a cylinder; a motor providing a driving force for movement of the piston; a sensing unit sensing a motor voltage and a motor current related to the motor; a discharge part installed at one end of the cylinder and adjusting discharge of a refrigerant compressed within the cylinder; and a controller detecting a load variation of the motor using at least one of the motor voltage and the motor current, detecting an absolute position of a top dead center (TDC) of the piston when an amount of the detected load variation is included in a predetermined range, and controlling the motor on the basis of the detected absolution position of the TDC.

The controller may control the motor such that the detected absolute position of the TDC falls within a predetermined distance interval from the discharge part.

The linear compressor may further include: a memory storing information related to mechanical characteristics of the linear compressor, wherein the controller may detect an initial position of the piston on the basis of the information related to the mechanical characteristics of the linear compressor and detect an absolute position of a TDC of the piston on the basis of the initial position of the piston.

The controller may estimate a stroke of the piston using the sensed motor voltage and motor current during driving of the linear compressor, and detect a distance over which the piston was pushed in a direction opposite to one side where the discharge part is installed, from the initial position of the piston on the basis of the estimated stroke.

The controller may detect an absolute position of the TDC of the piston on the basis of the detected pushed distance and the initial position of the piston.

The controller may calculate at least one of an error of the estimated stroke value and an error of the detected pushed distance, and update the absolute position of the TDC of the piston by reflecting the calculated error.

The linear compressor and the method for controlling the same according to the present invention have an advantage in that noise generated in the linear compressor may be reduced by reducing a collision force between the piston and the discharge valve. Also, according to the present invention, since collision between the piston and the discharge valve is prevented, wear of the piston and the discharge valve due to a collision may be reduced, increasing a lifespan of the mechanism and components.

Further, according to the linear compressor and the method for controlling the same according to the present invention, since an absolute position of the piston within the cylinder is detected without using an additional sensor, noise is reduced and highly efficient operation may be performed.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

The invention disclosed in this specification can be applied to a control device of a linear compressor and a method for controlling a linear compressor. However, the invention disclosed in this specification is not limited thereto and can be applied to all existing compressor control devices, compressor control methods, motor control devices, motor control methods, noise test devices for motors.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Hereinafter, an example of a general recipro-type reciprocating compressor will be described with reference to FIG. 1A.

As described above, the motor provided in the reciprocating compressor can be combined with a crankshaft $1a$, whereby a rotational motion of the motor can be converted into a linear reciprocating motion.

Figure 1A:
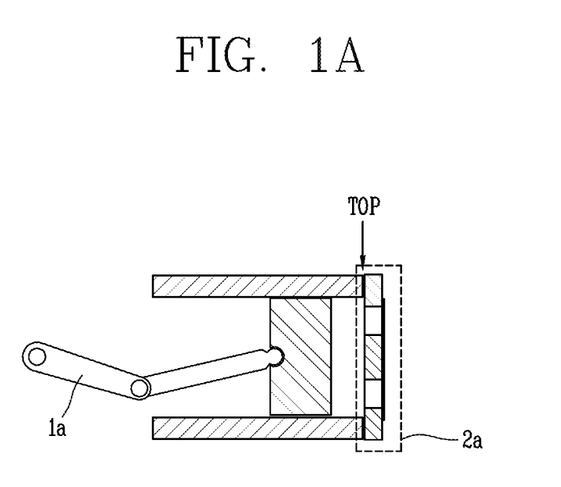
FIG. 1A is a conceptual diagram showing an example of a general recipro-type reciprocating compressor.

As shown in FIG. 1A, the piston provided in the recipro-type compressor can perform a linear reciprocating motion within a predetermined position range according to a specification of the crankshaft or a specification of a connecting rod connecting the crankshaft and the piston.

Therefore, in designing a reciprocating compressor, if the specifications of the crankshaft and the connecting rod are determined such that the piston does not exceed the top dead center (TDC) stage, the piston does not collide with the discharge part $2a$ disposed at one end of the cylinder.

In this case, the discharge part $2a$ installed in the recipro-type compressor can be fixedly installed with respect to the cylinder. For example, the discharge part $2a$ may be formed as a valve plate.

However, unlike the linear type compressor (to be described later), the recipro-type compressor has a problem in that friction occurs among the crankshaft, the connecting rod, and the piston, and therefore, there are more element which generates friction than those of the linear type compressor.

An example of a general linear type reciprocating compressor will be described below with reference to FIG. 1B. Also, FIGS. 1C-1D illustrate graphs relating to various parameters used for controlling a top dead center of a linear type reciprocating compressor.

Figure 1B:
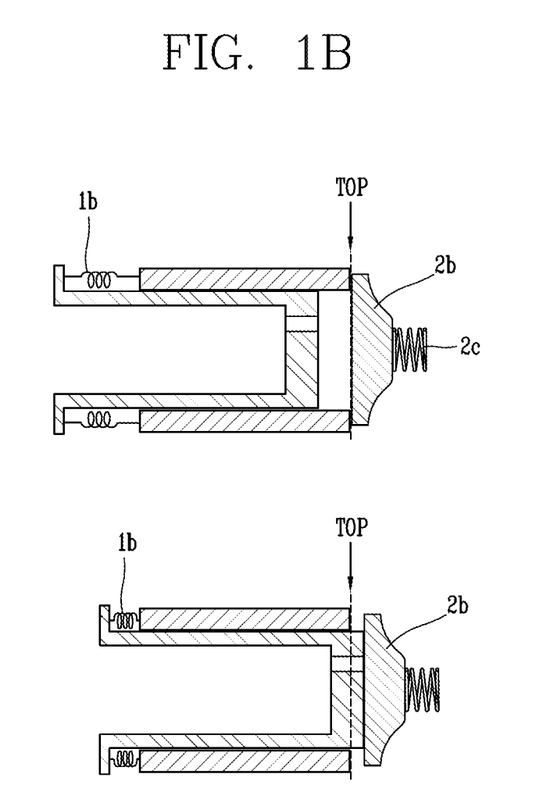
FIG. 1B is a conceptual view showing an example of a general linear type reciprocating compressor.
Figure 1C:
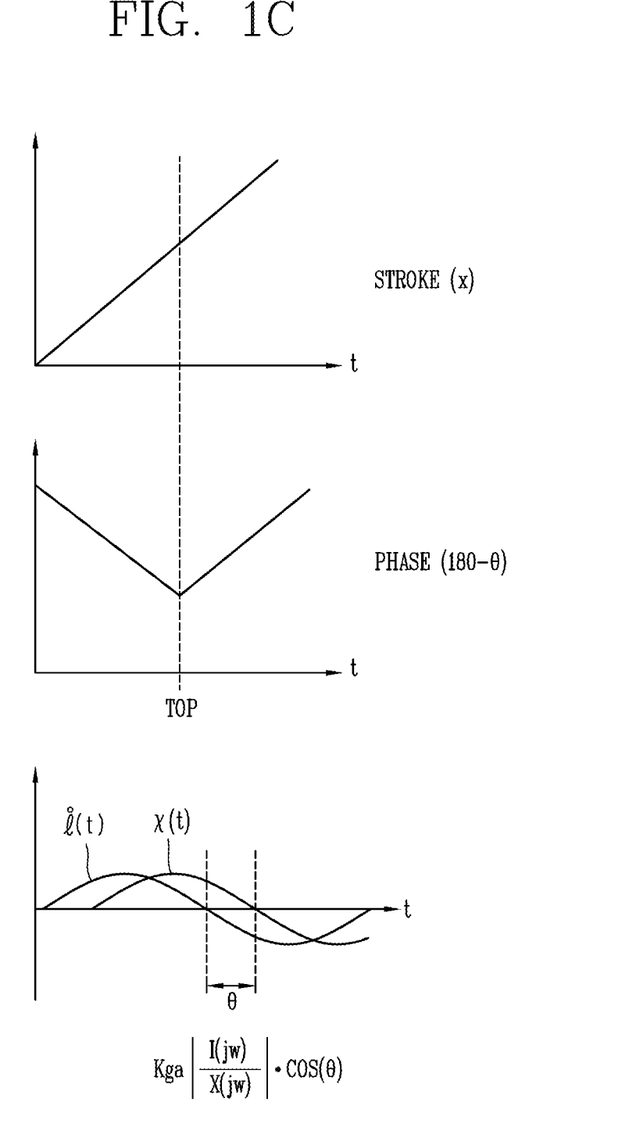
FIGS. 1C-1D are graphs relating to various parameters used for controlling a top dead center of a linear compressor.
Figure 1D:
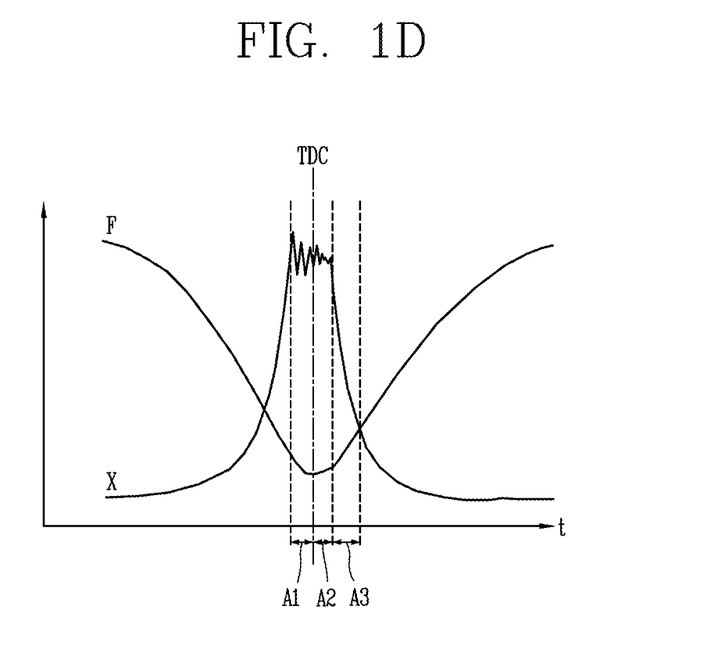

Comparing FIGS. 1A and 1B, unlike a recipro-type compressor in which a linear motion is implemented by a motor to which the crankshaft and the connecting rod are connected, the linear type compressor is a compressor in which the piston reciprocates by a linear motion of the motor by connecting the piston to a mover of the motor which linearly moves.

As shown in FIG. 1B, an elastic member $1b$ may be connected between the cylinder of the linear type compressor and the piston. The piston can perform a linear reciprocating motion by the linear motor, and the controller of the linear compressor can control the linear motor to change a direction of motion of the piston.

In detail, the controller of the linear compressor shown in FIG. 1B may determine a time point at which the piston collides with the discharge part $2b$ as a time point at which the piston has reached the top dead center (TDC), whereby the controller may control the linear motor to change a movement direction of the piston.

Referring to FIG. 1C together with FIG. 1D, a graph associated with the general linear compressor is illustrated. Specifically, as shown in FIG. 1C, a phase difference between a motor current (i) and a stroke (x) of the piston forms a point of inflection at a time point when the piston reaches the TDC.

The controller of the general linear compressor detects the motor current (i) using a current sensor, detects a motor voltage (not shown) using a voltage sensor, and estimates the stroke (x) based on the motor current and the motor voltage. Accordingly, the controller can calculate the phase difference (θ) between the motor current (i) and the stroke (x), and when the phase difference (θ) forms the point of inflection, the controller may determine that the piston has reached the TDC, and at this time, the controller may control the linear motor such that the movement direction of the piston is changed. Hereinafter, control the motor such that the piston does not exceed the TDC to prevent the controller of the linear compressor from colliding with the discharge part disposed at one end of the cylinder will be defined as "conventional TDC control".

The conventional TDC control is as follows.

In the conventional TDC control, the controller of the linear compressor can calculate a gas constant (Kg) related to a reciprocating motion of the piston in real time using the detected motor current and the estimated stroke.

Specifically, the controller can calculate the gas constant (Kg) using the following equation (1).

$$k_g = \alpha \times \left| \frac{I(jw)}{X(jw)} \right| \times \cos(\theta_{i,x}) + mw^2 - k_m \qquad \text{[Equation 1]}$$

Here, I(jw) denotes a peak value of one-period current, X(jw) denotes a peak value of one-cycle stroke, α denotes a motor constant or a counter electromotive force constant, θi,x denotes a phase difference between current and stroke, m denotes a movement mass of the piston, w denotes an operating frequency of the motor, and Km denotes a mechanical spring constant.

Also, Equation 2 related to a gas constant (Kg) is derived by the above equation.

$$k_g \propto \left| \frac{I(jw)}{X(jw)} \right| \times \cos(\theta_{i,x}) \qquad \text{[Equation 2]}$$

That is, the calculated gas constant (Kg) may be proportional to the phase difference between the motor current and the stroke.

Therefore, while monitoring the change in the gas constant (Kg) or the phase difference, the controller of the linear compressor can determine that the piston reaches the TDC when the gas constant (Kg) or the phase difference forms a point of inflection.

In addition, as shown in FIG. 1B, the general linear compressor that performs the TDC control as described above may have the discharge part $2b$ having an elastic member. In particular, the discharging part $2b$ provided in the related art linear compressor is connected to an elastic member having a relatively weak elastic force. In this case, since a repulsive force of the discharge part $2b$ and the piston is relatively weak, the compression state within the cylinder is unstable.

In order to solve the problem, in the linear compressor according to the present invention, an elastic member having a considerably increased repulsive force may be connected to the discharge part 2b. In this case, in the linear compressor according to the present invention, a force by which the discharge part 2b adheres to the cylinder is increased, and thus, when the piston and the discharge part 2b collide with each other, a repulsive force generated between the discharge part 2b and the piston is stronger than that of the related art linear compressor.

In another embodiment of the linear compressor according to the present invention, a discharge part having a valve plate may be included at one end of the cylinder. In this case, in the linear compressor including the discharge part formed with the valve plate, since the cylinder and the valve plate are fixedly coupled to each other, a repulsive force generated between the valve plate and the piston is stronger than that of the related art linear compressor.

Thus, using the fact that the repulsive force applied to the piston is increased as compared with the related art linear compressor, the movement of the piston can be controlled without additionally using a separate sensor in the linear compressor of the present invention.

The controller of the linear compressor performing the TDC control according to the present invention may calculate a stroke of the piston using the detected motor voltage and the motor current. In addition, the controller may control the motor such that the piston does not collide with the valve plate on the basis of a change in the calculated stroke.

Specifically, the controller of the linear compressor according to the present invention may continuously estimate the stroke of the piston while the piston reciprocates within the cylinder, to detect a change in the estimated stroke.

When a graph of the estimated stroke is compared with a graph of actual stroke, the estimated stroke and the actual stroke form a proportional relationship until the piston collides with the discharge part provided at one end of the cylinder. However, after the piston collides with the discharge part provided at one end of the cylinder, the estimated stroke and the actual stroke form an inverse relationship with each other.

As described above, since the repulsive force stronger than that of the related art linear compressor is provided to the piston of the linear compressor according to the present invention, the estimated stroke and the actual stroke can form the inverse relationship from the point of time of collision.

Hereinafter, a constitution of the present invention to solve the aforementioned problems and corresponding effects thereof will be described.

Hereinafter, an embodiment related to the components of the linear compressor will be described with reference to FIG. 2.

Figure 2:
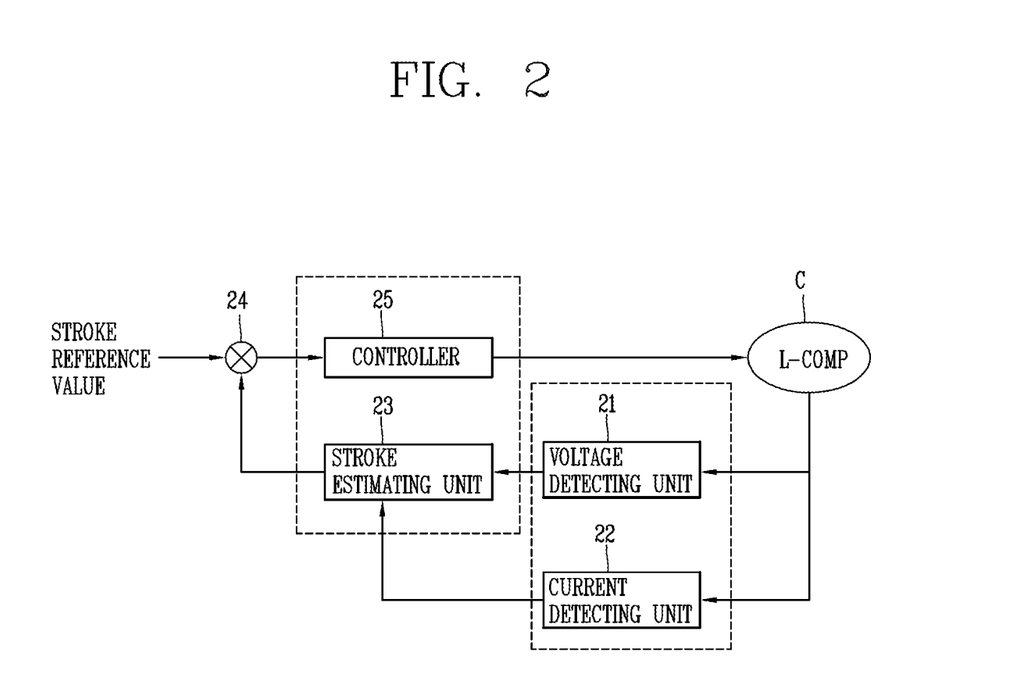
FIG. 2 is a block diagram showing components of a linear compressor.

FIG. 2 is a block diagram showing a configuration of a control device for a reciprocating compressor according to an embodiment of the present invention.

As shown in FIG. 2, the controller of the reciprocating compressor according to an embodiment of the present invention may include a sensing unit that senses a motor voltage and a motor current associated with the motor.

In detail, referring to FIG. 2, the sensing unit may include a voltage detecting unit 21 detecting a motor voltage applied to the motor, and a current detecting unit 22 detecting a motor current applied to the motor. The voltage detecting unit 21 and the current detecting unit 22 can transmit information related to the detected motor voltage and the motor current to the controller 25 or a stroke estimating unit 23.

Also, as illustrated in FIG. 2, the compressor or a control device of the compressor according to the present invention includes the stroke estimating unit 23 estimating a stroke by the detected motor current and motor voltage and a motor parameter, a comparator 24 comparing the stroke estimation value with a stroke reference value and outputting a difference according to a comparison result, and a controller 25 controlling the stroke by varying a voltage applied to the motor according to the difference.

The components of the control device shown in FIG. 2 are not essential, and thus, a compressor control device having greater or fewer components can be implemented.

Meanwhile, the compressor control device according to an embodiment of the present invention may be applied to a reciprocating compressor, but in this disclosure, it will be described herein with reference to a linear compressor.

Hereinafter, each component will be described.

The voltage detecting unit 21 detects a motor voltage applied to the compressor motor. According to an embodiment, the voltage detecting unit 21 may include a rectifying unit and a DC link unit. The rectifying unit may rectify an AC power having a predetermined voltage to output a DC voltage, and the DC link unit 12 may include two capacitors.

Also, the current detecting unit 22, which detects a motor current applied to the motor, may sense a current flowing in a coil of the compressor motor according to an embodiment.

Also, the stroke estimating unit 23 can calculate a stroke estimation value using the detected motor current and the motor voltage and the motor parameters, and apply the calculated stroke estimation value to the comparator 24.

Here, the stroke estimating unit 23 can calculate the stroke estimation value through Equation 3 below.

$$x = \frac{1}{\alpha} \int \left( V_m - Ri_m - L\frac{di_m}{dt} \right) dt \qquad \text{[Equation 3]}$$

Here, x denotes a stroke, α denotes a motor constant or counter electromotive force constant, Vm denotes a motor voltage, im denotes a motor current, R denotes resistance, and L denotes inductance.

Accordingly, the comparator 24 may compare the stroke estimation value with the stroke reference value and applies a corresponding difference signal to the controller 25, whereby the controller 25 may control the stroke by varying the voltage applied to the motor.

That is, the controller 25 decreases the voltage applied to the motor when the stroke estimation value is larger than the stroke reference value, and increases the voltage applied to the motor when the stroke estimation value is smaller than the stroke reference value.

As shown in FIG. 2, the controller 25 and the stroke estimating unit 23 may be formed as one unit. That is, the controller 25 and the stroke estimating unit 23 may correspond to a single processor or a computer.

Figure 3:
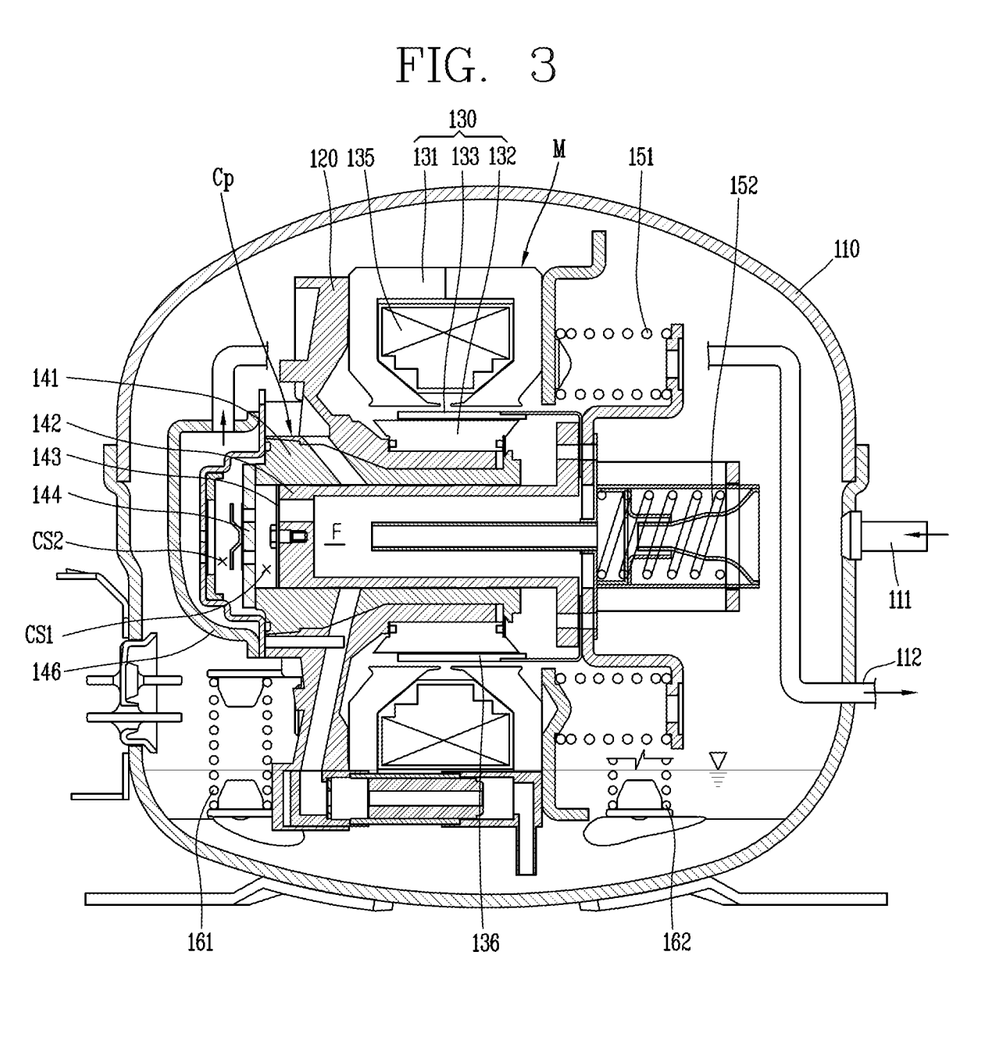
FIG. 3 is a cross-sectional view showing an embodiment of a linear compressor according to the present invention.

FIG. 3 is a cross-sectional view of a linear compressor according to the present invention.

The linear compressor according to an embodiment of the present invention may be a linear compressor to which a linear compressor control device or a compressor control device is applicable, regardless of type or form of a linear compressor. The linear compressor according to one embodiment of the present invention shown in FIG. 3 is merely illustrative and is not intended to limit the scope of the present invention.

Generally, a motor applied to a compressor is provided with a winding coil installed on a stator and a magnet installed on a mover, so that the mover rotates or reciprocates according to interaction between the winding coil and the magnet.

The winding coil can be formed variously according to motor types. For example, in the case of a rotary motor, a winding coil may be wound as a concentrated winding or a distributed winding around a plurality of slots formed in a circumferential direction on an inner circumferential surface of the stator, and in the case of a reciprocating motor, a coil is wound in an annular shape to form a winding coil and a plurality of core sheets are inserted and coupled to an outer circumferential surface of the winding coil in a circumferential direction.

In particular, in the case of the reciprocating motor, since a winding coil is formed by winding the coil in an annular shape, generally, a coil is wound around an annular bobbin formed of a plastic material to form a winding coil.

As illustrated in FIG. 3, the reciprocating compressor has a structure in which a frame 120 is resiliently installed by a plurality of support springs 161 and 162 in an inner space of a closed shell 110. A suction pipe 111 connected to an evaporator (not shown) of the refrigerating cycle is connected to an internal space of the shell 110, and a discharge pipe 112 connected to a condenser (not shown) of the refrigerating cycle device is installed on one side of a suction pipe 111 in a communicating manner.

An outer stator 131 and an inner stator 132 of a reciprocating motor 130 constituting a motor unit M are fixedly mounted in the frame 120 and a mover 133 making a reciprocating motion is provided between the outer stator 131 and the inner stator 132. A piston 142 constituting a compression part Cp together with a cylinder 141 (to be described later) is coupled to the mover 133 of the reciprocating motor 130 to perform a reciprocating motion.

The cylinder 141 is provided within a range in which the cylinder 141 overlaps with the stators 131 and 132 of the reciprocating motor 130 in an axial direction. A compression space CS1 is formed in the cylinder 141 and a suction flow channel F guiding a refrigerant to the compression space CS1 is formed in the piston 142. The suction valve 143 for opening and closing the suction flow channel F is formed at an end of the suction flow channel F, and a discharge valve 145 for opening and closing the compression space CS1 of the cylinder 141 is installed at a front end surface of the cylinder 141.

For reference, a discharge part of the linear compressor according to the present invention may be formed in various forms.

For example, as illustrated in FIG. 3, the linear compressor according to the present invention may include a discharge part formed as a valve plate. That is, the discharge part used in the conventional recipro-type compressor can be applied to the linear compressor according to the present invention.

In another example, the linear compressor according to the present invention may include a discharge part having an elastic member as illustrated in FIG. 1B. That is, the discharge part which has been used in the existing linear compressor may also be applied to the linear compressor according to the present invention.

However, an elastic force of the elastic member provided in the discharging part of the linear compressor according to the present invention may be greater than the elastic force of the elastic member provided in a general linear compressor.

Figure 4:
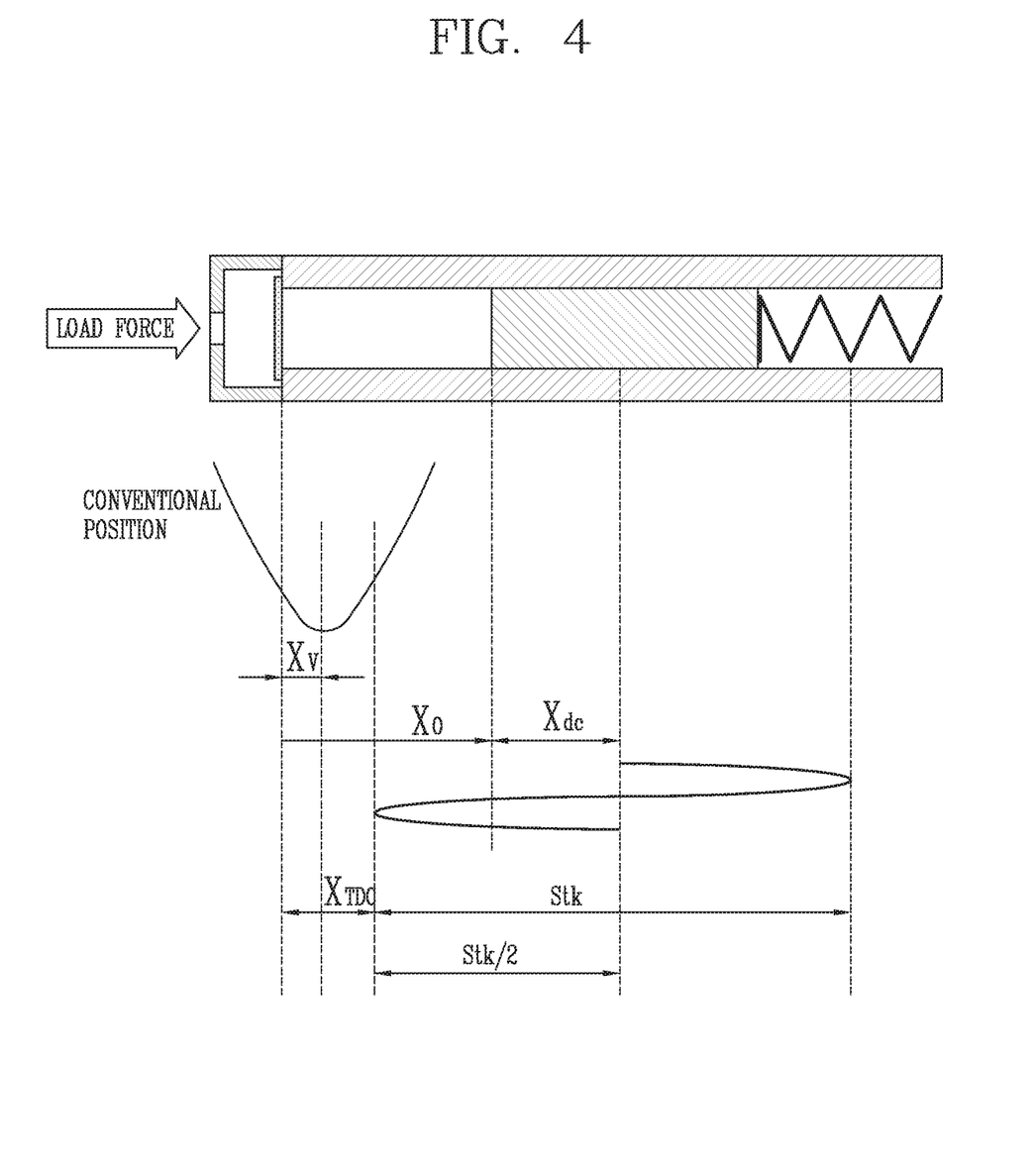
FIG. 4 is a conceptual diagram showing an embodiment of a linear compressor according to the present invention.

FIG. 4 illustrates an embodiment of a method for controlling a linear compressor according to the present invention.

Referring to FIG. 4, distance variables defined by the cylinder, the piston and the discharge PART are described.

First, a distance between a central position of the piston and the discharge part within the cylinder before the linear compressor is driven is defined as X0.

When the linear compressor is being driven, a distance between the TDC of the piston and the discharge part is defined as XTDC.

A distance between the TDC and a BDC of the piston is defined as Stk.

A distance over which the central position of the piston is pushed within the cylinder after the linear compressor is driven is defined as Xdc.

In detail, when the linear compressor starts to be driven, a stronger load is applied when the piston moves toward the TDC than when the piston moves toward the BD, and thus, even when the controller outputs the same stroke command or voltage command, a position of the position can be gradually pushed away from the discharge part. In FIG. 4, the distance over which the piston was pushed from an initial position is defined as Xdc.

Further, at a point in time when a control parameter related to the piston of the linear compressor forms a point of inflection, a distance between the TDC of the piston and the discharge part is defined as Xv. Xv may be a constant set according to the design of the compressor.

For example, when the control parameter corresponds to the gas constant (Kg), a point of inflection of the gas constant (Kg) theoretically occurs when the piston comes into contact with the discharge part, so that Xv can be set to zero. However, Xv is not limited thereto and can be set to be different according to the design of the compressor or a change in the control parameter.

The distance (XTDC) between the TDC of the piston and the discharge part can be calculated by the Equation 4 below.

$$X_{TDC} = X_0 + X_{dc} - \frac{Stk}{2}$$ [Equation 4]

Further, the distance XTDC between the TDC of the piston and the discharging part can be corrected by the Equation 5 below.

$$X_{TDC\_C} = X_{TDC} + (X_V - X_{V\_obj})$$ [Equation 5]

In Equation (5), XTDC_C denotes an updated value of the XTDC.

In Equation (5), Xv_obj denotes XTDC calculated at the time when the control parameter forms a point of inflection.

In an embodiment, the controller 25 of the linear compressor according to the present invention can detect a load variation of the motor using at least one of the motor voltage and the motor current.

The controller 25 may calculate a compensation value related to a position of the piston whenever a load variation of the motor is detected, and may control an absolute position of the piston using the calculated compensation value.

In detail, the controller 25 can estimate a stroke of the piston using the motor voltage and the motor current, and on the basis of the estimated stroke, the controller 25 may calculate the distance Xdc over which the piston was pushed, from an initial position of the piston before the linear compressor starts to be driven.

The controller 25 can calculate the distance XTDC between the TDC of the piston and the discharge part using the estimated stroke and the calculated pushed distance Xdc.

In addition, the controller 25 can calculate a parameter related to the movement of the piston in real time using the estimated stroke and the detected motor current. The controller 25 can calculate the distance XTDC between the TDC of the piston and the discharge part at the time when the calculated parameter forms the point of inflection. The controller 25 can compare XTDC at the time when the parameter forms the point of inflection with a predetermined reference distance and calculate the compensation value on the basis of a comparison result.

The controller 25 may control the motor to maintain the distance XTDC between the TDC of the piston and the discharge part at a distance equal to or shorter than a predetermined limit distance.

For example, when the calculated XTDC is larger than the predetermined limit distance, the controller 25 may increase the stroke reference value or increase the motor voltage or the motor current The controller 25 can detect an operation rate of the motor and determine whether or not load of the motor fluctuates on the basis of the detected operation rate.

However, the controller 25 can determine a load variation of the motor in various manners in addition to the operation rate. That is, when a user input for changing the output of the linear compressor is applied, the controller 25 can determine that a load variation of the motor occurs.

The controller 25 can calculate a compensation value related to the position of the piston at the time of initial driving of the motor.

In detail, the compensation value related to the position of the piston may include an error of the stroke (Stk) estimation value and an error of the calculation result of the distance (Xdc) over which the piston was pushed from the initial position.

That is, when the controller 25 calculates the distance XTDC between the TDC of the piston and the discharge part, the controller 25 may calculate a compensation value related to the position of the piston at the initial starting of the motor or whenever the load of the motor is varied, in order to reduce an error which may occur.

A specific method of calculating the compensation value by the controller 25 is as follows.

First, when the compressor starts to be driven, the controller 25 can calculate the distance XTDC between the TDC of the piston and the discharge part. That is, the controller 25 can calculate the XTDC at a first time point.

Next, the controller 25 can monitor a change in the control parameter (e.g., the gas constant (Kg)) related to the movement of the piston used in the conventional TDC control.

The controller 25 can calculate the distance XTDC between the TDC of the piston and the discharge part at a second time point at which the control parameter forms the point of inflection during monitoring. Here, a theoretical position of the piston at the time when the control parameter forms the point of inflexion is defined as Xv, and the XTDC calculated at the second time point is defined as Xv_obj.

The controller 25 can calculate a final XTDC by adding the resultant value obtained by subtracting Xv_obj from Xv to XTDC at the first time point. That is, the controller 25 can calculate the compensation value related to the position of the piston by subtracting Xv_obj from Xv.

On the other hand, the controller 25 can calculate the compensation value related to the position of the piston even when a load fluctuation amount of the motor is equal to or less than a predetermined value for a predetermined time interval. That is, even when the load of the motor is maintained for a considerable period of time, the controller 25 can update XTDC by calculating a compensation value related to the position of the piston.

In an embodiment, the controller 25 can detect a phase difference between the estimated stroke and the motor current, and calculate the pushed distance Xdc of the piston using the detected phase difference. In detail, the controller 25 can calculate the pushed distance Xdc of the piston using a predetermined equation including the phase difference between the estimated stroke and the motor current as variables.

For example, the controller 25 may calculate the gas constant Kg and the damping constant Cg using the phase difference, and calculate the pushed distance Xdc of the piston using the gas constant, the damping constant, and the stroke have. That is, the controller 25 may calculate the pushed distance Xdc of the piston using the predetermined equation including the gas constant Kg, the damping constant Cg, and the stroke Stk, as variables.

In another embodiment, when an amount of the detected load variation is within a predetermined range, the controller 25 of the linear compressor according to the present invention can detect an absolute position of the TDC of the piston. The controller 25 can control the motor on the basis of the detected absolute position of the TDC.

That is, the controller 25 can compare the detected absolute position of the TDC and the stroke reference value, and adjust the motor voltage on the basis of a comparison result.

The controller 25 can control the motor such that the detected absolute position of the TDC falls within a predetermined distance from the discharge part.

The controller 25 may further include a memory (not shown) storing information related to mechanical characteristics of the linear compressor.

The controller 25 may detect an initial position of the piston on the basis of the information related to the mechanical characteristics of the linear compressor and detect the absolute position of the TDC of the piston on the basis of the initial position of the piston.

For example, the information related to the mechanical characteristics of the linear compressor may include information related to standard of the cylinder of the linear compressor, the piston, and a spring provided in the piston or information related to an initial installation position of the piston within the cylinder.

The controller 25 may estimate the stroke Stk of the piston using the sensed motor voltage and the motor current during driving of the linear compressor and detect the distance Xdc over which the piston is pushed in a direction opposite to one side where the discharge part is installed within the cylinder, from the initial position of the piston on the basis of the estimated stroke.

The controller 25 can detect the absolute position of the TDC of the piston on the basis of the detected pushed distance Xdc and the initial position of the piston.

The controller 25 may calculate at least one of an error of the estimated stroke value and an error of the detected pushed distance Xdc and update the absolute position of the TDC of the piston by reflecting the calculated error.

Figure 5:
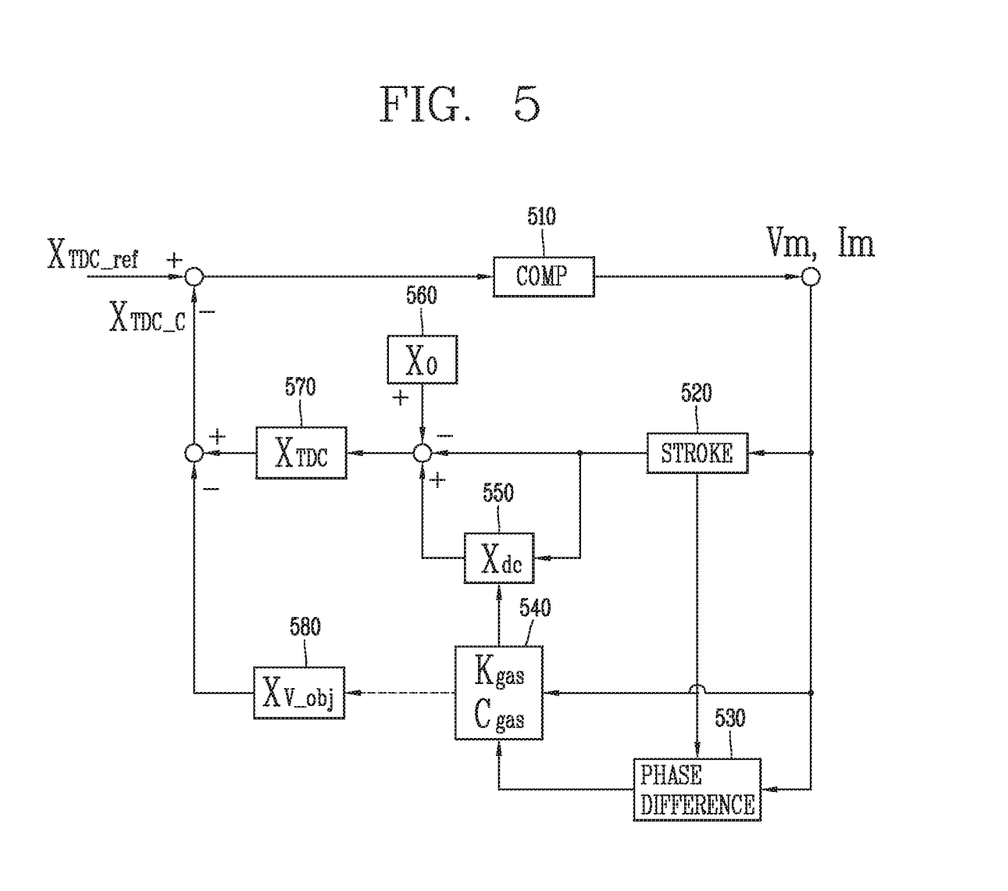
FIG. 5 is a conceptual diagram showing a control process of a linear compressor according to the present invention in an s-domain.

Referring to FIG. 5, a process on an S-domain related to calculation of Xdc, XTDC, Xv_obj, the gas constant (Kg) and the damping constant Cg by the controller 25 is illustrated.

Figure 6:
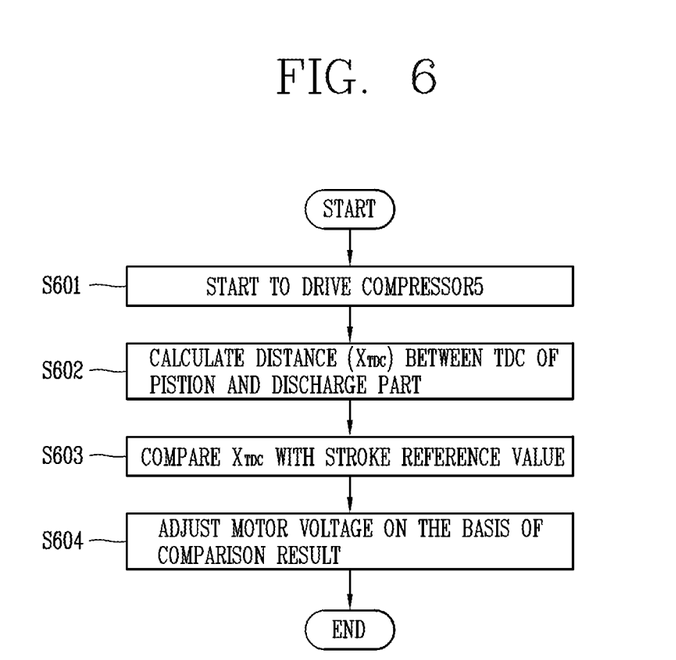
FIG. 6 is a flow chart showing a method for controlling a linear compressor according to the present invention.

Referring to FIG. 6, an embodiment of a method for controlling a linear compressor according to the present invention is described.

When the compressor starts to be driven (S601), the controller 25 can generate a stroke reference value having a predetermined value and calculate the distance XTDC between the TDC of the piston and the discharge part (S602).

The controller 25 can compare the stroke reference value and the XTDC (S603), and adjust the motor voltage on the basis of a comparison result (S604).

Figure 7:
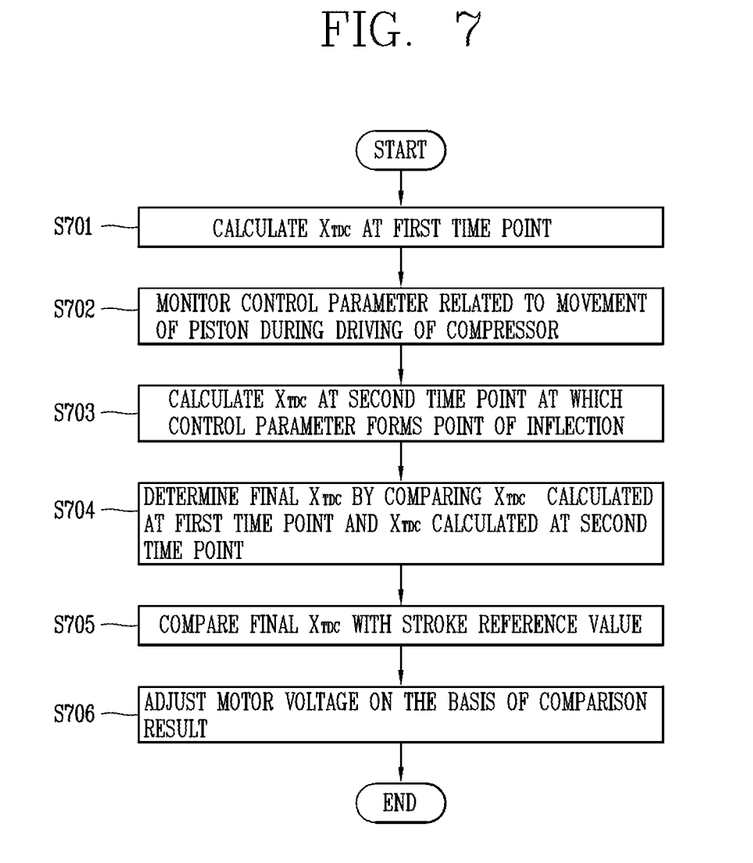
FIG. 7 is a flow chart showing a method for controlling a linear compressor according to the present invention.

In FIG. 7, another embodiment of the method for controlling a linear compressor according to the present invention is described.

After the compressor starts to be driven, the controller 25 can calculate XTDC at an arbitrary first time point (S701).

The controller 25 may monitor a control parameter related to the movement of the piston during the driving of the compressor (S702). During the monitoring of the control parameter, the controller 25 may again calculate the XTDC at a second time point at which the control parameter forms a point of inflection (S703).

The controller 25 may compare the XTDC calculated at the first time point and the XTDC calculated at the second time point to determine a final XTDC (S704).

Thereafter, the controller 25 may compare the final XTDC value with the stroke reference value (S705), and adjust the motor voltage on the basis of a comparison result (S706).

The linear compressor and the method for controlling a linear compressor according to the present invention have an advantage in that noise generated in the linear compressor may be reduced by reducing a collision force between the piston and the discharge valve. Also, according to the present invention, since collision between the piston and the discharge valve is prevented, wear of the piston and the discharge valve due to a collision may be reduced, increasing a lifespan of the mechanism and components.

Further, in the linear compressor and the method for controlling a linear compressor according to the present invention, since an absolute position of the piston within the cylinder is detected without using an additional sensor, noise is reduced and highly efficient operation may be performed.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A linear compressor comprising:
a piston configured to reciprocate within a cylinder;
a motor configured to provide a driving force that causes movement of the piston;
a sensing unit configured to sense a motor voltage and a motor current of the motor;
a discharge part located at one end of the cylinder and configured to adjust discharge of a refrigerant compressed within the cylinder; and
a controller that is configured to detect a load variation of the motor using at least one of the motor voltage or the motor current, that is configured to calculate a compensation value related to a position of the piston based on the detected load variation of the motor, and that is configured to detect an absolute position of the piston using the calculated compensation value,
wherein the controller is configured to, based on the load variation of the motor being equal to or smaller than a predetermined value during a preset time interval, calculate the compensation value related to the position of the piston,
wherein the controller is configured to calculate a length of stroke of the piston using the motor voltage and the motor current, and calculate a control parameter related to movement of the piston in real time using the calculated length of stroke and the sensed motor current,
wherein the controller is configured to calculate a distance between a top dead center (TDC) of the piston and the discharge part at a time point that corresponds to a point of inflection of the calculated control parameter, and
wherein the controller is configured to calculate the compensation value by subtracting the distance from a pre-set constant.

2. The linear compressor of claim 1, wherein
the controller is configured to estimate a stroke of the piston using the motor voltage and the motor current, and
the controller is configured to, based on the estimated stroke, calculate a distance over which the piston was pushed from an initial position of the piston before driving of the linear compressor starts.

3. The linear compressor of claim 2, wherein
the controller is configured to calculate a distance between the TDC of the piston and the discharge part using the estimated stroke and the calculated pushed distance.

4. The linear compressor of claim 3, wherein
the controller is configured to calculate a parameter related to movement of the piston using the estimated stroke and the sensed motor current,
the controller is configured to calculate a distance between the TDC of the piston and the discharge part based on the calculated parameter being a point of inflection, and
the controller is configured to calculate the compensation value by comparing the calculated distance with a preset reference distance.

5. The linear compressor of claim 4, wherein
the controller is configured to re-calculate the distance between the TDC of the piston and the discharge part based on the calculated compensation value.

6. The linear compressor of claim 5, wherein
the controller is configured to control the motor to maintain the distance between the TDC of the piston and the discharge part at a distance equal to or shorter than a preset limit distance.

7. The linear compressor of claim 1, wherein
the controller is configured to detect an operation rate of the motor, and determine whether a load variation of the motor has occurred based on the detected operation rate.

8. The linear compressor of claim 1, wherein
based on the motor being initially driven, the controller is configured to calculate the compensation value related to the position of the piston.

9. The linear compressor of claim 2, wherein
the controller is configured to detect a phase difference between the estimated stroke and the motor current, and
the controller is configured to calculate the distance over which the piston was pushed using the detected phase difference.

10. A linear compressor comprising:
a piston configured to reciprocate within a cylinder;
a motor configured to provide a driving force that causes movement of the piston;
a sensing unit configured to sense a motor voltage and a motor current of the motor;
a discharge part installed at one end of the cylinder and configured to adjust discharge of a refrigerant compressed within the cylinder; and
a controller that is configured to detect a load variation of the motor using at least one of the motor voltage or the motor current, that is configured to detect an absolute position of a top dead center (TDC) of the piston based on an amount of the detected load variation being within a predetermined range, and that is configured to control the motor based on the detected absolute position of the TDC,
wherein the controller is configured to calculate a length of stroke of the piston using the motor voltage and the motor current, and calculate a control parameter related to movement of the piston in real time using the calculated length of stroke and the sensed motor current,
wherein the controller is configured to calculate a distance between the TDC of the piston and the discharge part at a time point that corresponds to a point of inflection of the calculated control parameter, and
wherein the controller is configured to calculate a compensation value by subtracting the distance from a pre-set constant.

11. The linear compressor of claim 10, wherein
the controller is configured to control the motor to cause the detected absolute position of the TDC to fall within a predetermined distance interval from the discharge part.

12. The linear compressor of claim 10, further comprising:
a memory configured to store information related to mechanical characteristics of the linear compressor,
wherein the controller is configured to detect an initial position of the piston based on the information related to the mechanical characteristics of the linear compressor, and
wherein the controller is configured to detect an absolute position of a TDC of the piston based on the initial position of the piston.

13. The linear compressor of claim 12, wherein
the controller is configured to estimate a stroke of the piston using the sensed motor voltage and motor current during driving of the linear compressor, and
the controller is configured to detect a distance over which the piston was pushed from the initial position of the piston in a direction opposite to a side where the discharge part is installed based on the estimated stroke.

14. The linear compressor of claim 13, wherein
the controller is configured to detect an absolute position of the TDC of the piston based on the detected pushed distance and the initial position of the piston.

15. The linear compressor of claim 14, wherein
the controller is configured to calculate at least one of an error of the estimated stroke value or an error of the detected pushed distance, and update the absolute position of the TDC of the piston by reflecting the calculated error.

16. The linear compressor of claim 1, wherein the controller is configured to compare the load variation of the motor to the predetermined value at a time during the preset time interval, determine, based on the comparison, that the load variation of the motor is equal to or smaller than the predetermined value at the time during the preset time interval, and calculate the compensation value related to the position of the piston in response to the determination that the load variation of the motor is equal to or smaller than the predetermined value at the time during the preset time interval.

17. The linear compressor of claim 10, wherein the controller is configured to determine the amount of the detected load variation, compare the determined amount of the detected load variation to the predetermined range, determine, based on the comparison, that the determined amount of the detected load variation is within the predetermined range, and detect the absolute position of the TDC of the piston in response to the determination that the determined amount of the detected load variation is within the predetermined range.

* * * * *